Oct. 8, 1935.  M. J. ZUCROW  2,016,881

FUEL CONDITIONING AND SUPPLY SYSTEM

Filed Nov. 20, 1931  3 Sheets-Sheet 1

Inventor
Maurice J. Zucrow
by John Flam
Attorney

Oct. 8, 1935.                M. J. ZUCROW                2,016,881
              FUEL CONDITIONING AND SUPPLY SYSTEM
                      Filed Nov. 20, 1931            3 Sheets—Sheet 2

Inventor
Maurice J. Zucrow
by John Ham
Attorney

Oct. 8, 1935. M. J. ZUCROW 2,016,881
FUEL CONDITIONING AND SUPPLY SYSTEM
Filed Nov. 20, 1931 3 Sheets-Sheet 3
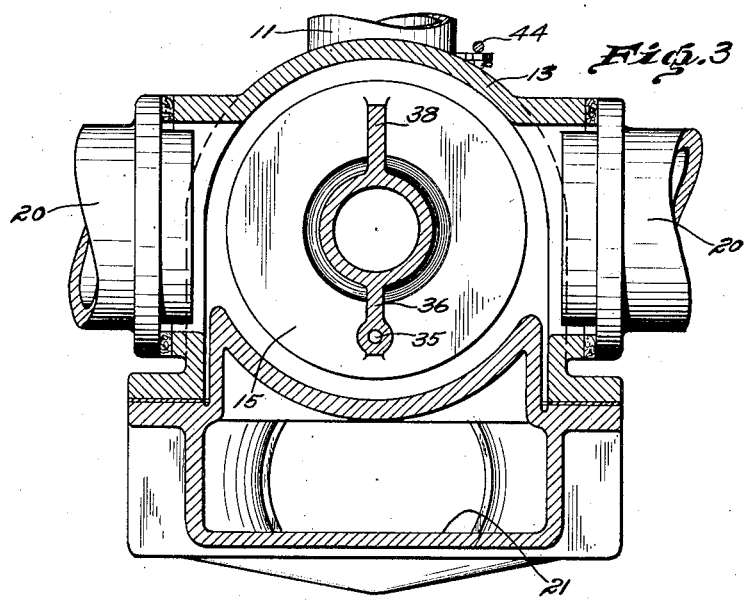
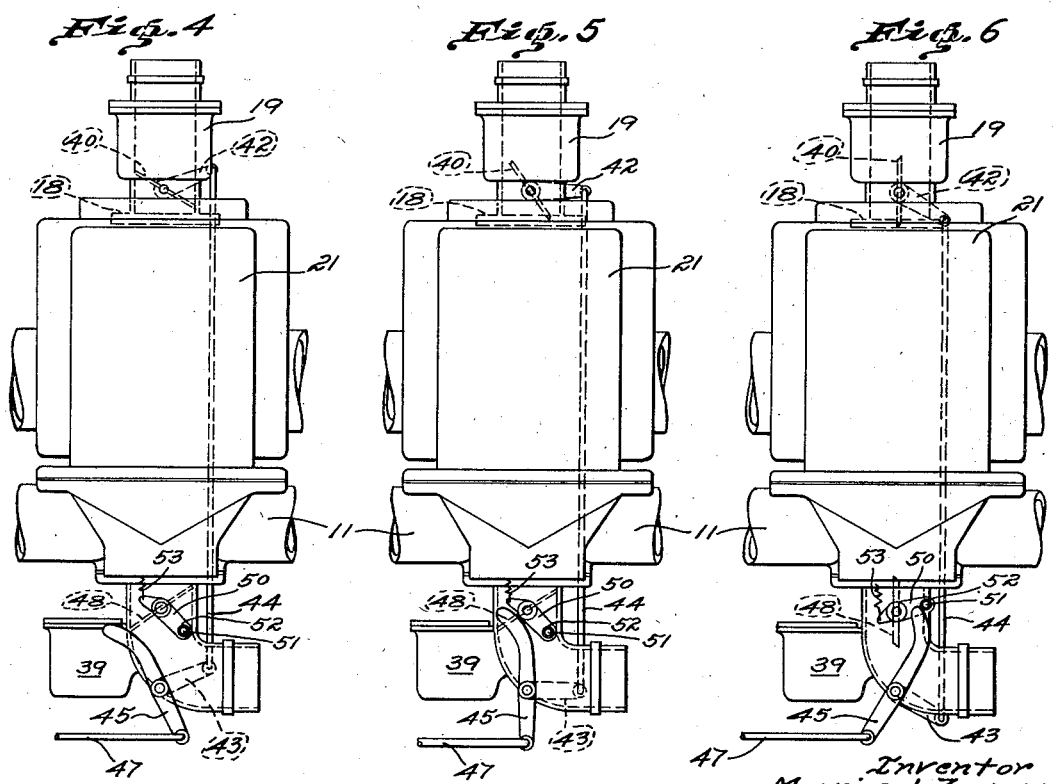
Inventor
Maurice J. Zucrow
by John Flam
Attorney Patented Oct. 8, 1935

2,016,881

UNITED STATES PATENT OFFICE 2,016,881

FUEL CONDITIONING AND SUPPLY SYSTEM

Maurice Joseph Zucrow, Chicago, Ill.

Application November 20, 1931, Serial No. 576,295

6 Claims. (Cl. 123—133)

This invention relates to a fuel conditioning system which enables operating internal combustion engines on low grade fuels, such as the heavier hydrocarbon fuels, as well as gasoline. More particularly, this system embodies the use of a vaporizer which functions to gasify the fuels, and also to provide a means whereby the final and correct fuel-air mixture can be delivered to the engine at a temperature and pressure which satisfy the requirements for proper combustion, as well as for high thermal efficiency and high power output.

This invention is a continuation in part of my copending application to a Carburetion system, Serial No. 494,083, filed November 7, 1930.

In my copending application to a Method and apparatus for utilizing fuels in internal combustion engines, Serial No. 576,296, filed November 20, 1931, I describe a low grade fuel system which causes an internal combustion engine to operate with a degree of success comparable to an engine burning gasoline. An engine utilizing that system operates at a high efficiency and high power output because for a unit volume of cylinder space, the weight of the fuel-air mixture can be kept at a high value, comparable to that occurring in well designed gasoline engines using high grade fuels. In other words, the volumetric efficiency of the engine is as high as when high grade fuels are used. This condition is materially assisted by the fact that the fuel-air mixture is utilized at temperatures only slightly higher than ordinary atmospheric temperatures.

Due to the combination of comparatively low temperatures and of suitable pressure conditions obtained by means of the invention disclosed in my copending application, it is possible substantially to duplicate the efficiency in operation of an engine burning gasoline. Obviously, this is of prime commercial importance, as the cost of such low grade hydrocarbon fuels is only a fraction of that of gasoline. In addition, a vaporizer for low grade fuels is utilized that works so effectively that a substantially uniformly diffused fuel-air mixture is obtained prior to its distribution to the intake ports of the engine.

These results are readily accomplished by providing a heated conduit to which a fuel-air mixture, provided by a carburetor, is passed. This conduit is placed above and directed downwardly to the distributing manifold. That portion of the fuel which is not sufficiently finely divided, is plastered onto the walls of the conduit to vaporize it and thus assure that a uniform and intimate fuel-air mixture will be formed. Thus, the larger fuel particles are placed into intimate heat exchange relationship with the conduit, ensuring that the particles of fuel, not effectively utilizable as such by the engine, will be vaporized and diffused throughout the air stream to form the desired combustive mixture.

The efficiency of this system is greatly increased by the provision of a novel means for ensuring an equal distribution of the explosive charge to the several cylinders of the engine, and by a means for controlling the final temperature of the fuel-air mixture in such a way that a materially lower temperature mixture can be utilized in the engine without danger of fuel depositing or condensing in the manifold. This deposition is obviated by the short time interval elapsing between the mixing of the dry fuel-air mixture and a cold stream of air to lower the temperature, and the induction of this mixture into the engine cylinders.

In some instances, the space conditions available for installing the vaporizer may be so limited, that a vaporizer of a size necessary to secure a dry discharge mixture cannot be conveniently used. Consequently, if a vaporizer of smaller than the correct size or proportions is used, some of the fuel will pass into the intake manifold and consequently into the engine in an unvaporized state.

It is therefore an object of my invention to make it possible to use a vaporizer of small proportions, when required, and at the same time to ensure that substantially all of the fuel passed through the vaporizer will be vaporized or subdivided. I accomplish this by the provisions of a trap located adjacent the hottest portion of the vaporizer and immediately below the place where the fuel is plastered onto a heated conduit. In this manner, a means is provided for receiving those particles of fuel which are not sufficiently atomized or vaporized. The fuel particles which find their way into this trap are readily evaporated therein and the fuel vapor formed combines with the main fuel-air mixture passing through the vaporizer.

It is a further object of my invention to provide a means for ensuring that a uniformly intimate mixture will be formed when vaporizers of small proportions are utilized. I accomplish this by the provision of a venturi located in the lower part of the vaporizer. Within the venturi, vaporization is further promoted by means of heat, and by the drop in pressure of the fuel-air stream occurring at the Venturi throat. In this latter region the fuel-air mixture moves with a high velocity which promotes a rapid rate of heat transfer. The decreased pressure at the Venturi throat produces a thorough mixing of the fuel and air forming a vaporized and homogeneous fuel-air mixture.

During normal loads, the fuel-air mix is such that a dry condition thereof is obtained without excessive temperatures. However, when the engine is operated at or near its full load capacity, the fuel mixture, to be maintained in a dry condition, must be at a higher temperature. However, a dry mixture is not necessary under these conditions, since equal results are obtainable if the final fuel-air charge can be maintained in the form of a fog or mist. To produce this fog at the lowest permissible temperature, matters are arranged so that when full load conditions are approached, the final fuel-air mix is kept cool. This is accomplished by cooling an over-rich fuel-air mixture by a supplemental stream of air. This supplemental stream is not used however, except near full load conditions.

It is a further object of my invention to provide a device of this character that is simple in design and construction and relatively inexpensive in manufacture.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 3 is a transverse sectional view thereof taken substantially along the plane 3—3 of Fig. 1; and Figs. 4, 5 and 6 are diagrammatic elevations of the device, showing the different stages of operation of a preferred mechanism for introducing the cooling stream of air to an over-rich dry mixture at the proper time.

Figure 1:
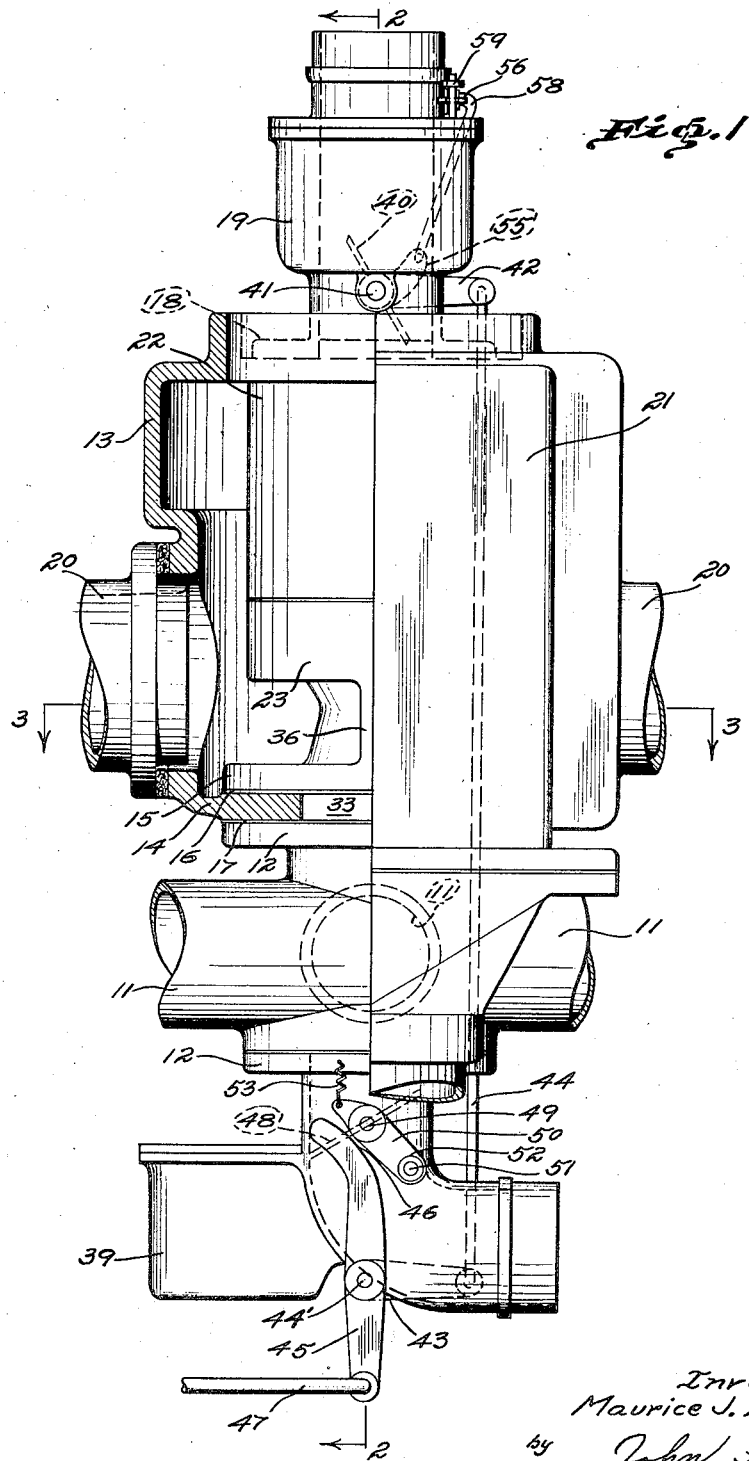
Figure 1 is a front elevation, with part in section, of a fuel supply system embodying my invention.

The engine 10 (Fig. 2) has inlet manifolds 11 leading to the cylinders of the engine. A heated conduit A for vaporizing fuel, extends above and leads into the manifold 11, forming a downwardly extending passageway which communicates with the intake manifold. Although the particular manner in which conduit A is supported is of no consequence, it is shown in this instance as resting on a flange 12, integral with manifold 11, and secured thereto in a manner to be described. Conduit A is made from metal or other good heat conducting material and is so arranged that its wall can be heated, as by the passage of exhaust gases around it.

The heating of conduit A is accomplished in this instance by means of a jacket structure 13 which surrounds the conduit A, forming a passageway through which exhaust gases may pass. This structure is shown as having a lower flange 14 which is sandwiched between the conduit and flange 12, and secured in place as by bolts passing through a lower flange 15 of the conduit and the flanges 14 and 12. Gaskets 16 and 17 can be used to form an air tight connection. The conduit A is closed at the top as by a flange 18, formed integral with a conventional carburetor 19. This flange 18 is secured to the walls of the conduit around the top of the opening in any desired manner. The structure 13 is secured to the top of conduit A as by a sliding fit seal in order to compensate for relative expansion due to temperature differences. Fuel and air can be drawn through conduit A from the carburetor 19 by the pumping action of the engine 10. The manner of inducting the fuel and air to produce a moving column of a fuel-air mixture will be hereinafter described.

Before proceeding with a description of the mode of operation of conduit A to vaporize the fuel, a description of the exhaust passageway that conducts the hot gases from the exhaust of the engine around this conduit can be first set forth. Thus, there are shown conduits 20 (Fig. 1) leading from the exhaust passages or manifold of the engine and connected adjacent the lower portion of the jacket 13, thereby communicating with the interior of the structure. The outlet to the muffler for the exhaust gases is shown as formed by a downwardly depending conduit 21 leading from the upper portion of the structure 13 and secured thereto in any desirable manner. The exhaust gases thus pass upwardly in the structure 13 around the conduit A and downwardly through the conduit 21. In this manner, conduit A can be effectively heated to provide an internal heated surface to which any unvaporized fuel is passed, in a manner to be hereinafter described.

Figure 2:
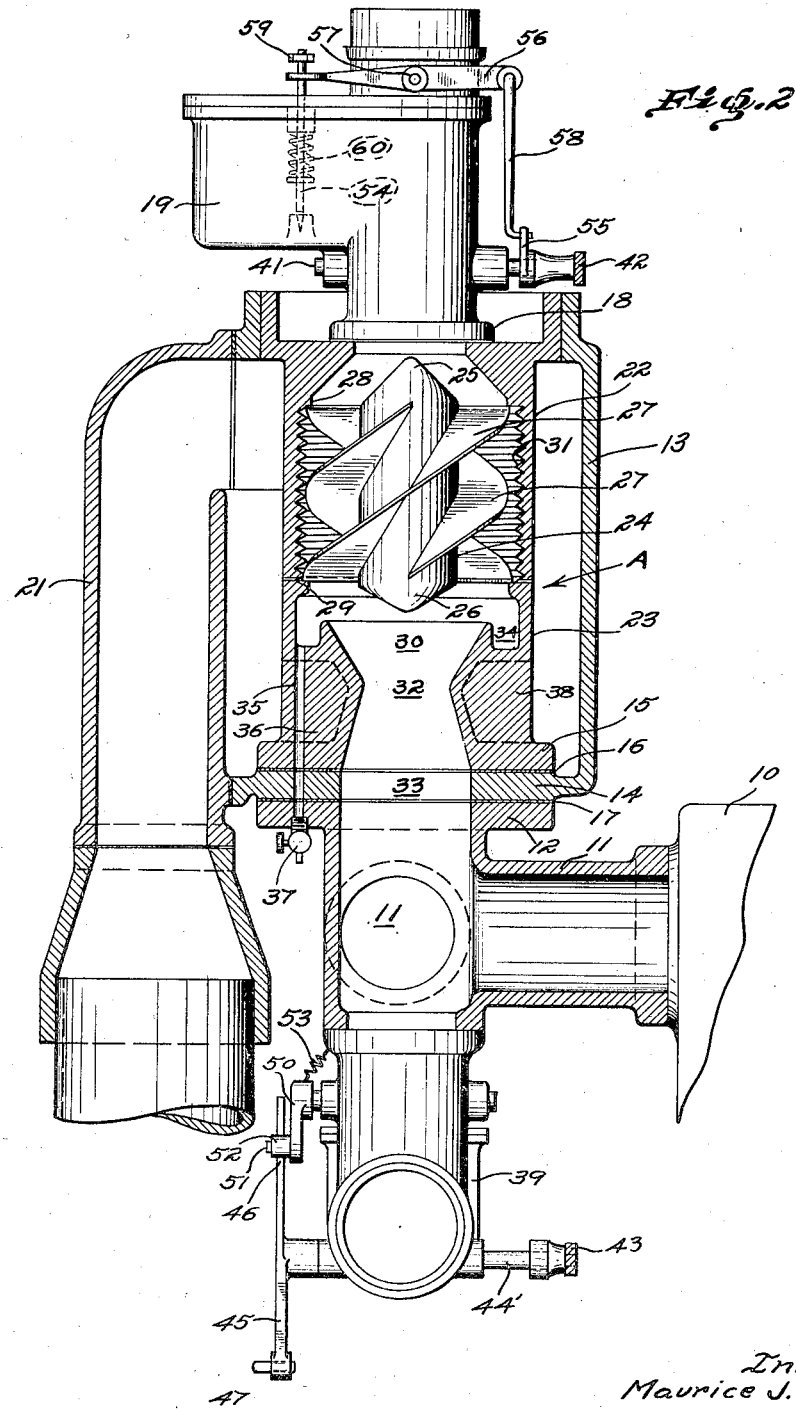
Fig. 2 is a longitudinal section thereof, with part in elevation, taken substantially along the plane 2—2 of Fig. 1.

The conduit A is shown as being made up of a vaporizer 22 and a Venturi tube 23. These parts, as shown in Fig. 2, can be separate and bolted together; or if desired, they can be formed as a single unit. The conduit can be removed as a unit thereby making the heating surface of the vaporizer available for cleaning purposes.

As hereinabove pointed out, the upper end of the vaporizer 22 is closed off except for its communication to the fuel carburetor 19. The passage for the fuel-air mixture through the vaporizer 22 is preferably made annular in section, as by the provision of a central tube 24 that is closed at its top and bottom 25 and 26, respectively.

Matters are arranged in such a way that if a mixture of fuel and air is caused to progress downwardly through the annular space defined by vaporizer 22 and tube 24, any unused fuel particles are urged or plastered against the heated inner wall of vaporizer 22. For this purpose, the air stream is caused to whirl or rotate, so as to set up a centrifugal action and thus urge the unvaporized fuel particles outwardly by the force thus generated. This combined centrifugal action and downward motion produces a scrubbing action between the fuel plastered against the heated wall 22, the conduit and the moving air; a condition which promotes a rapid vaporization of the fuel. Various means for producing this centrifugal action are available, but in this instance there is shown a plurality of helicoidal vanes 27 disposed around tube 24, which define a passageway for the air stream to cause it to progress angularly about the axis of vaporizer 22 as it flows downwardly. Both the tube 24 and the vanes 27 are supported in the vaporizer by means of the overhanging shoulders 28 and 29 on the vaporizer 22 and venturi 23 respectively.

The closed end 25 of tube 24 is cone-shaped in order to minimize the pressure loss which might arise from the impingement thereon of the fuel and air from the carburetor 19. The closed lower end 26 of the tube 24 should not project at all, or at most only a small distance, into the Venturi tube entrance 30.

It is of course to be understood that fuel and air are mixed together in a conventional carburetor 19 and are discharged downwardly into the vaporizer 22. This fuel-air mixture passes through the helicoidal path between tube 24 and vaporizer 22, in a downward direction, with a helical or rotary motion. This motion causes those liquid particles entrained in the air stream which are too large to be effectively utilized, to be ejected laterally from the air stream by centrifugal force, against the inner wall of vaporizer 22, where they are readily vaporized by the heat transmitted to them by the exhaust gases through the medium of the walls defining the vaporizer. The inner surface of the vaporizer 22 can be grooved as indicated at 31 in order to increase the area of the vaporizing surface.

The vaporized fuel leaving the grooved wall 31 of the vaporizer 22 is diffused into the air stream and enters into the venturi 23. Vaporization of the fuel is further promoted within the venturi 23 as by the heat imparted thereto from the exhaust gases circulating in the structure 13, and by the drop in pressure occurring at the Venturi throat 32. In the latter region the fuel-air mixture moves with a high velocity, which permits a rapid rate of heat transfer, and the decreased pressure causes a thorough mixing of the fuel and air, forming a vaporized fuel-air mixture in which the fuel and air are intimately and uniformly commingled. By properly proportioning the two sections of the conduit A, it is possible to secure a dry fuel-air mixture at a comparatively low temperature and with small pressure loss as the mixture leaves the discharge end 33.

In the instances where it is desired to burn a low-grade fuel instead of gasoline, a much higher temperature is required. Consequently, a dry mixture leaving the conduit A may be so hot that the volumetric efficiency of the engine will be seriously impaired and the tendency of the engine to detonate, will increase. In such cases it is best, as above described, to cause only a portion of the air and all of the fuel to pass through the conduit A, and to mix the resulting dry over-rich mixture with a supplementary air stream after the dry mixture enters the intake manifold 11. The proportions of these two air streams are so arranged that the resulting mixture entering the engine cylinders is at the lowest possible temperature which will not cause any precipitation or condensation of the fuel. Since the time interval elapsing from the mixing of the dry mixture and the cold air up to the point of combustion is very short, as set forth in my above mentioned copending application, the final mixture can be cooled several degrees below its static dew-point without any condensation taking place. The fuel will be in that fine and stable state of subdivision commonly known as a "fog". In this condition, as far as its distribution to the several cylinders of the engine is concerned, it distributes the same as a dry mixture which is capable of burning completely.

The construction of conduit A makes it possible to secure complete vaporization of the fuel with a relatively small vaporizer such as the short tube 22.

In some instances, the space conditions available for installing the vaporizer may be so limited that a vaporizer of the proportions necessary to secure a dry mixture at its discharge end cannot be conveniently used. Consequently, if a vaporizer of smaller than the correct proportions is to be used, some of the fuel will not be vaporized. I shall now describe how the passage of unvaporized fuel into the intake manifold is obviated.

The upstanding portions defining the entrance 30 to the throat 32 of the venturi, forms with the walls of the venturi a trap 34, into which those particles of fuel which are not sufficiently atomized or vaporized, can fall by gravity. As is readily apparent from Fig. 2, trap 34 is located immediately below the vaporizer 22 and in a position to receive readily all unvaporized fuel particles. As is readily apparent from Fig. 1, this trap is located in the region where the exhaust gases are the hottest, i. e., where the latter enter into the exhaust manifold structure 13 (Fig. 1). The unvaporized fuel particles which find their way into the trap 34 are readily evaporated therein. The fuel vapor formed combines with the main fuel-air charge passing through the vaporizer 22 and into the Venturi entrance 30.

In the case of certain fuels such as crude oil, it is not advisable to endeavor to utilize the heaviest fractions thereof, and accordingly these are collected in trap 34 and drained away, through a passageway 35 leading to a reservoir, from which they may be removed when convenient. The passageway 35 is formed at the extremity of a rib 36 which in turn is formed integrally with the venturi 23 and extends laterally therefrom as clearly shown in Fig. 3. A pet-cock 37 is positioned at the bottom of passageway or drain 35 to control the flow of the heavier fuel fractions from trap 34 (Fig. 2). A rib 38 oppositely disposed to rib 36 is likewise formed integral with venturi 23.

The ribs or fins 36 and 38 direct the flow of the exhaust gases upwardly, after the latter impinge upon the venturi. This produces a counter-flow heat transfer condition, which is quite advantageous.

Since in some instances, it is desirable to use a vaporizer which is as small as possible, and which at the same time will produce a dry fuel-air mixture, it is especially important that at low loads all of the air consumed by the engine be in intimate contact with all of the fuel. When such a condition exists, a dry mixture can successfully operate at relatively low temperatures, as little or no condensation will take place in the intake manifold This is due to the fact that there is a decrease in pressure in the manifold as a result of the passage of the mixture through the venturi. When full load of the engine is approached, the temperature needed to produce such a dry mixture is comparatively high and the engine power is seriously diminished. To enable full power to be developed, the fuel-air mixture must be made cooler. To accomplish this, a part of the requisite air is taken into the engine without heating, through the medium of a cold air device 39. This cold air is admitted only in the range of operation of the engine approaching full load and is operated in conjunction with the conventional fuel carburetor 19 in a manner now to be described.

Referring to Figs. 1 and 2, it will be seen that the fuel carburetor throttle 40 is secured to a shaft 41 which in turn is adapted to be operated by a lever 42 for opening and closing the throttle. Lever 42 is connected to a lever 43 by means of a connecting rod 44 which can be attached at each of its ends to these levers by means of ball and socket joints. Lever 43 is secured at its other end to one end of an auxiliary shaft 44 in the cold air carburetor 39. A lever 45 is secured to the other end of the auxiliary shaft 44'.

Lever 45 is secured to shaft 44' at a point substantially equi-distant from the ends of the lever. The exact point of attachment will vary with the different mechanical arrangements utilized, as will be apparent from the description to follow; however, the general mode of operation is the same in all instances.

The upper end of lever 45 is cam-shaped as at 46, and the lower end is provided with a connection to which the accelerator or actuating rod 47 can be secured. Throttle 48 for the cold air device 39 is shown as secured to a shaft 49. A lever 50 is secured to shaft 49 and is adapted to be actuated for opening and closing throttle 48. A pin or projection 51 is formed adjacent the lower extremity of lever 50 and is surrounded by a loose roller 52. A spring 53 secured to the top of lever 50 and flange 12 of the intake manifold serves to exert a clockwise rotative force on lever 50 for normally maintaining throttle 48 in a closed position.

The operation necessary for controlling the opening and closing of throttles 40 and 48 will be readily apparent from an inspection of Figs. 4, 5 and 6. The closed positions of the throttles are shown in Fig. 4. The operator of the engine opens the fuel carburetor 40 and governs the engine output by actuating accelerator 47. This causes levers 45 and 43 to be rotated in a clockwise direction. This movement exerts a downward pull on rod 44 and a consequent clockwise rotation of lever 42 to open throttle 40. An intermediate open position of throttle 40 is shown in Fig. 5, and it will be apparent from this figure that the movement of the parts as above set forth do not affect the position of cold air throttle 48. For the first part of the movement of accelerator rod 47 throttle 48 remains closed.

As the movement of accelerator rod 47 is continued, a point is reached where cam 46 of lever 45 contacts with the roller 52 on pin 51. This point of contact is usually arranged, depending on the character of the fuel, to occur when the fuel carburetor throttle lever 42 has moved through about three-fourths of its total possible movement from its closed position. Continued movement of accelerator rod 47 not only completely opens the fuel carburetor throttle 40, but causes throttle 48 to open due to the action of cam 46 on roller 52, as is clearly shown in Fig. 6. From this time on, the engine 10 is supplied with a cooler mixture than that which would result if all of the air utilized in this mixture were passed through conduit A.

Although I have shown and described a mechanism whereby the throttle of the cold air device is controlled by that of the fuel carburetor, it is possible to operate and govern the movement of the cold air device throttle by means dependent upon the vacuum in the manifold; the latter being an index of the load of the engine. Obviously, the cold air control can take other forms than a conventional throttle, such as an air valve.

When the engine approaches full load, the fuel used causes detonation. The detonation can be suppressed by means of an anti-detonating fluid which can be metered into the fuel-air mix from the device 39 as set forth in my above mentioned copending application. However, the cold air from device 39 assists in suppressing detonation, and consequently diminishes the quantity of anti-detonating fluid needed to suppress detonation.

It will be apparent from the drawings, that when cold air is admitted through the cold air device 39, the suctions in the venturi (not shown) of the fuel carburetor 19 would tend to decrease in value. This results in a tendency of the final fuel-air mixture to become progressively leaner as the carburetor throttles 40 and 48 are opened wide. To compensate for this tendency, an auxiliary or full power metering needle 54 (Fig. 2) can be used. This needle can be lifted or depressed, depending upon the construction of carburetor 19, at the instant that the cold air carburetor throttle 48 begins to open. The actuation of this metering needle 54 causes more fuel to be delivered to the air flow through the fuel carburetor 19 and therefore corrects the final mixture ratio arriving in the engine cylinders.

The mechanism for accomplishing this is shown in Figs. 1 and 2. Thus a lever 55 is shown as being secured to shaft 41 and adapted to be rotated therewith. Lever 55 causes a clockwise rotational movement of a lever 56 (which is pivoted as at 57 to carburetor 19), through the medium of a connecting rod 58. The free end of lever 56 is bifurcated and is adapted to straddle the needle 54. A stop member 59 is secured to needle 54 against which the bifurcated end lever 56 is adapted to contact for lifting needle 54 against the action of spring 60. It will be apparent from Fig. 2 that lever 56 must be rotated for a short distance before its bifurcated end comes in contact with stop 59 for lifting the needle 54. Therefore, a part of its motion produces no effect on needle 54. The degree of this lost motion is predetermined and is made to come into play when the cold air throttle 48 begins to open. The stop member 59 is accordingly made adjustable to accomplish this desired purpose. It will be apparent from Figs. 4 to 6 that due to the shape and proportioning of cam 46 of lever 45, the cold air carburetor throttle 48 is moved from a fully closed position to its wide open position during the interval from the time that cam 46 first contacts with roller 52, to the time when the fuel carburetor 40 reaches its wide open position.

I claim:

1. In a vaporizer for liquid fuels for use in internal combustion engines, a heated conduit through which air and entrained liquid is adapted to pass, said conduit comprising a vaporizer for subdividing the fuel and dispersing it into the air stream to form a fuel-air mixture, a Venturi construction in the conduit into which the mixture is adapted to pass whereby said venturi will be heated, and means intermediate the vaporizer and venturi for collecting the unvaporized fuel particles from the mixture and at the same time subjecting them to a further state of subdivision whereby they may readily intermingle in that state with the fuel-air mixture formed by the vaporizer, said venturi serving to reduce the pressure of the mixture and at the same time continue the subdivision of the fuel whereby a combustible homogeneous fuel-air mixture is formed.

2. In a vaporizer for liquid fuels for use in internal combustion engines, a vaporizer, means forming passageways surrounding the vaporizer and leading from the engine exhaust whereby the exhaust gases can be used for heating the vaporizer, said vaporizer serving to subdivide the fuel and disperse it into an air stream to form a fuel-air mixture, means for collecting the unvaporized fuel particles from the mixture, said means being directly in the path of the exhaust gases as they emerge from the exhaust passageways so that the intensity of the heat applied to the vaporizer is greatest adjacent said means whereby the collected fuel particles are subjected to a further state of subdivision and thereby caused to intermingle with the fuel-air mixture, and means beyond said collecting means also subjected to the heat from the exhaust gases, for reducing the pressure of the mixture and at the same time continuing the subdivision of the fuel whereby a combustible homogeneous fuel-air mixture is formed.

3. In a vaporizer for liquid fuels for use in internal combustion engines, a carburetor for causing the fuel to be entrained in a stream of air, a throttle in said carburetor controlling the flow of the fuel, means for subdividing the fuel and dispersing it into the air stream to form a dry fuel-air mixture capable of operating the engine at low loads, said means including a heated venturi and a collector for unvaporized fuel particles, a cold air device, a throttle in said device controlling the flow of air therethrough, means connecting said throttles, said means acting to first open the throttle in the fuel carburetor, and to open the cold air throttle for introducing a cooling stream of air into the mixture only when the range of operation approaches full load, and means coordinated with the opening of the cold air throttle for increasing the flow of fuel in the first named carburetor.

4. In a vaporizer for liquid fuels for use in internal combustion engines, means for subdividing the fuel and dispersing it into an air stream to form a fuel-air mixture capable of operating the engine at low loads, means for heating the mixture, means for introducing a cooling stream of air into the mixture only as the range of operation of the engine approaches full load, and means for injecting an anti-detonating fluid into the cooling stream of air for suppressing detonation, said cool stream of air serving to diminish the quantity of anti-detonating fluid needed to suppress detonation.

5. In a vaporizer for liquid fuels for use in internal combustion engines, means forming a down feed heated conduit through which air and entrained liquid is adapted to pass, said conduit comprising a vaporizer for subdividing the fuel and dispersing it into the air stream to form a fuel-air mixture, a heated Venturi construction into which the mixture is adapted to pass, and means intermediate the vaporizer and venturi for collecting the unusable fuel particles from the mixture and at the same time subjecting them to a further state of subdivision whereby they may readily intermingle in that state with the fuel-air mixture formed by the vaporizer, said means being heated simultaneously with said conduit and venturi, said venturi serving to reduce the pressure of the mixture and at the same time continue the subdivision of the fuel whereby a combustible homogeneous fuel-air mixture is formed.

6. In a vaporizer for liquid fuels for use in internal combustion engines, a carburetor for causing the fuel to be entrained in a stream of air, a throttle in said carburetor controlling the flow of the fuel, means forming a down feed heated vaporizer for subdividing the fuel and dispersing it into the air stream to form a dry fuel-air mixture capable of operating the engine at low loads, a heated venturi connected to the vaporizer heated means between the vaporizer and venturi to collect unvaporized fuel particles, a cold air device, a throttle in said device controlling the flow of air therethrough, means connecting said throttles, said means acting to first open the throttle in the fuel carburetor, and to open the cold air throttle for introducing a cooling stream of air into the mixture only when the range of operation approaches full load, and means coordinated with the opening of the cold air throttle for increasing the flow of fuel in the carburetor.

MAURICE JOSEPH ZUCROW.